United States Patent
Saint-Loup et al.

(10) Patent No.: US 11,866,546 B2
(45) Date of Patent: Jan. 9, 2024

(54) THERMOPLASTIC POLYESTER WITH HIGH INCORPORATION OF 1,4:3,6-DIANHYDRO-L-IDITOL UNITS

(71) Applicant: ROQUETTE FRERES, Lestrem (FR)

(72) Inventors: René Saint-Loup, Lomme (FR); Nicolas Jacquel, Lambersart (FR)

(73) Assignee: ROQUETTE FRERES, Lestrem (FR)

( * ) Notice: Subject to any disclaimer, the term of this patent is extended or adjusted under 35 U.S.C. 154(b) by 17 days.

(21) Appl. No.: 16/755,754

(22) PCT Filed: Oct. 10, 2018

(86) PCT No.: PCT/FR2018/052505
§ 371 (c)(1),
(2) Date: Apr. 13, 2020

(87) PCT Pub. No.: WO2019/073169
PCT Pub. Date: Apr. 18, 2019

(65) Prior Publication Data
US 2020/0255590 A1    Aug. 13, 2020

(30) Foreign Application Priority Data
Oct. 11, 2017 (FR) ..................... 17 59525

(51) Int. Cl.
C08G 63/672 (2006.01)
C08G 63/80 (2006.01)
C08L 67/02 (2006.01)

(52) U.S. Cl.
CPC ........... C08G 63/672 (2013.01); C08G 63/80 (2013.01); C08L 67/025 (2013.01); C08L 2205/06 (2013.01)

(58) Field of Classification Search
CPC .... C08G 63/672; C08G 63/80; C08G 63/181; C08G 63/183; C08G 63/78; C08L 67/025; C08L 2205/06; C08L 23/08; C08L 23/14; C08L 51/04; C08L 53/00
See application file for complete search history.

(56) References Cited

U.S. PATENT DOCUMENTS

| | | | |
|---|---|---|---|
| 618,730 A | 1/1899 | Reibel | |
| 6,737,481 B1 | 5/2004 | Kurian et al. | |
| 8,809,424 B2 | 8/2014 | Feron et al. | |
| 10,400,062 B2 * | 9/2019 | Jacquel | C08G 63/672 |
| 2017/0037181 A1 | 2/2017 | Van Haveren et al. | |
| 2017/0335055 A1 * | 11/2017 | Jacquel | C08G 63/863 |
| 2018/0155493 A1 | 6/2018 | Jacquel et al. | |

FOREIGN PATENT DOCUMENTS

| | | |
|---|---|---|
| EP | 1 882 712 A1 | 1/2008 |
| WO | 99/54399 A1 | 10/1999 |
| WO | 2015/142181 A1 | 9/2015 |
| WO | 2015/166070 A1 | 11/2015 |
| WO | 2016/066956 A1 | 5/2016 |
| WO | 2016/189239 A1 | 12/2016 |

OTHER PUBLICATIONS

Thiem et al.; "Synthesis of Polyterephthalates Derived from Dianhydrohexitols," Polymer Bulletin; 1984; pp. 365-369; vol. 11.
Feb. 19, 2019 Search Report issued in International Patent Application No. PCT/FR2018/052505.

* cited by examiner

Primary Examiner — Robert D Harlan
(74) Attorney, Agent, or Firm — Oliff PLC

(57) ABSTRACT

A thermoplastic polyester, and in particular a thermoplastic polyester including at least one 1,4:3,6-dianhydro-L-iditol unit (A), at least one linear aliphatic diol unit (B), at least one aromatic dicarboxylic unit (C), the thermoplastic polyester having a reduced viscosity in solution (25° C.; phenol (50 wt. %):ortho-dichlorobenzene (50 wt. %); 5 g of polyester/L) greater than 25 mL/g. A method for preparing such a polyester, a composition including the same and the use of the thermoplastic polyester for the production of finished or semi-finished plastic articles. The thermoplastic polyester is advantageous in that it has a particularly high incorporation rate of 1,4:3,6-dianhydro-L-iditol (A) units, at least greater than 85%, and most specifically at least greater than 90%.

13 Claims, No Drawings

THERMOPLASTIC POLYESTER WITH HIGH INCORPORATION OF 1,4:3,6-DIANHYDRO-L-IDITOL UNITS

FIELD OF THE INVENTION

The present invention relates to the field of polymers and concerns in particular a thermoplastic polyester comprising at least one 1,4:3,6-dianhydro-L-iditol unit. A subject of the invention is also a process for preparing said polyester, a composition comprising said polyester and also the use of said polyester for the production of finished or semi-finished plastic articles.

TECHNICAL BACKGROUND OF THE INVENTION

Because of their numerous advantages, plastics have become inescapable in the mass production of objects. Indeed, their thermoplastic character enables these materials to be transformed at a high rate into all kinds of objects.

Conventionally, certain thermoplastic aromatic polyesters have thermal properties which allow them to be used directly for the production of materials. They comprise aliphatic diol and aromatic diacid units. Among these aromatic polyesters, mention may be made of polyethylene terephthalate (PET), which is a polyester comprising ethylene glycol and terephthalic acid units, used for example in the manufacture of containers, packaging, films or else fibers.

With regard to the ethylene glycol and terephthalic acid units included in PET, they can be obtained either by esterification reaction of ethylene glycol and terephthalic acid, or by transesterification reaction of ethylene glycol and terephthalic acid ester.

However, for certain applications or under certain conditions of use, these polyesters do not exhibit all the required properties. This is why glycol-modified PETs (PETgs) have been developed. These are generally polyesters comprising, in addition to the ethylene glycol and terephthalic acid units, cyclohexanedimethanol (CHDM) units. The introduction of this diol into the PET allows it to adapt the properties to the intended application, for example to improve its impact resistance or its optical properties, in particular when the PETg is amorphous. On the other hand, the increase in the glass transition temperature caused by CHDM is very moderate.

For essentially ecological reasons, plastics resulting from petrochemistry are less and less popular and new solutions have started to emerge. Renewable sources are increasingly appearing in thermoplastic polyesters, all the more so since the latter make it possible to confer improved properties on the polyester which incorporates them.

Thus, other modified PETs have also been developed by introducing, into the polyester, 1,4:3,6-dianhydrohexitol units, in particular isosorbide (PEITs). These modified polyesters have higher glass transition temperatures than the unmodified PETs or the PETgs comprising CHDM. In addition, 1,4:3,6-dianhydrohexitols have the advantage of being able to be obtained from renewable resources such as starch. These modified polyesters are especially useful for manufacturing bottles, films, thick sheets, fibers or articles requiring high optical properties.

However, in general, one of the problems encountered in the production of polyesters comprising 1,4:3,6-dianhydrohexitol units lies in the fact that the degree of incorporation of these units is not always high, and depending on the synthesis conditions, a degree of loss of up to 50% is sometimes observed. A high degree of 1,4:3,6-dianhydrohexitol unit incorporation is however desirable to achieve sufficient thermal and mechanical performance results for various applications, such as for example in the packaging sector.

The low incorporation can be explained by the fact that the reactions for esterification of isosorbide with terephthalic acid or for transesterifications with alkyl terephthalates involve secondary hydroxyls and are consequently slower than reactions involving primary alcohols such as ethylene glycol or 1,3-propanediol. Consequently, this induces an insufficient incorporation of the isosorbide into the copolymer.

With a view to obtaining an improved incorporation of isosorbide into polyesters, document U.S. Pat. No. 6,737,481 describes a process implementing the synthesis of a linking unit. This linking unit consists of isosorbide and diacids such as isophthalic acid and phthalic acid. The linking unit then undergoes a polycondensation step by mixing with a prepolymer. The prepolymer can be chosen from poly(alkylene terephthalate), with a preference for poly(1,3-propylene terephthalate). After the polycondensation step, a preferred polymer is poly(ethylene-co-isosorbide isophthalate).

Document U.S. Pat. No. 618,730 describes a process for producing polyester comprising isosorbide, said process making it possible to obtain a high degree of isosorbide incorporation in the final polyester. The process describes the melting of a first polyester incorporating isosorbide with a second polyester for a time sufficient to allow a transesterification reaction and to thus obtain a copolymer. The first polyester consists essentially of isosorbide unit and of dicarboxylic acid unit, while the second polyester essentially consists of dicarboxylic acid unit and of a diol unit other than isosorbide.

Thus, it is known that improvement of the degrees of isosorbide unit incorporationin into polyesters can be obtained by the synthesis of a prepolymer. However, the synthesis of a prepolymer, apart from improving the degrees of incorporation, constitutes an additional step in the processes for preparing thermoplastic polyesters. There is therefore a need to have a particular thermoplastic polyester with a high degree of incorporation of 1,4:3,6-dianhydrohexitol unit that can be obtained by means of a process not requiring an intermediate step of prepolymer synthesis.

It is thus to the credit of the applicant to have found that this objective can be achieved, against all expectations, with a thermoplastic polyester comprising at least one 1,4:3,6-dianhydro-L-iditol unit.

SUMMARY OF THE INVENTION

A first subject of the invention therefore relates to a thermoplastic polyester and particularly a thermoplastic polyester comprising:
  at least one 1,4:3,6-dianhydro-L-iditol unit (A),
  at least one linear aliphatic diol unit (B),
  at least one aromatic dicarboxylic acid unit (C),
said polyester having a reduced viscosity in solution (25° C.; phenol (50 wt. %):ortho-dichlorobenzene (50 wt. %); 5 g of polyester/l) greater than 25 ml/g.

A second subject of the invention relates to a process for preparing a thermoplastic polyester as defined above.

A third subject relates to a composition comprising a polyester as defined above.

Finally, a fourth subject of the invention relates to the use of said polyester or of a composition comprising said polyester for the production of finished or semi-finished plastic articles, such as packaging.

The thermoplastic polyester according to the invention is advantageous in that it has a high degree of 1,4:3,6-dianhydro-L-iditol unit incorporation. Compared to thermoplastic polyesters based on 1,4:3,6-dianhydrosorbitol units, the polyester according to the invention has lower 1,4:3,6-dianhydro-L-iditol unit losses at the time of preparation. Thus, the process for obtaining said polyester has an improved yield.

DETAILED DESCRIPTION OF THE INVENTION

The thermoplastic polyester which is the subject of the invention is a thermoplastic polyester comprising:
at least one 1,4:3,6-dianhydro-L-iditol unit (A),
at least one linear aliphatic diol unit (B),
at least one aromatic dicarboxylic acid unit (C),
said thermoplastic polyester having a reduced viscosity in solution (25° C.; phenol (50 wt. %):ortho-dichlorobenzene (50 wt. %); 5 g of polyester/l) greater than 25 ml/g.

Entirely surprisingly, the inventors have found that the thermoplastic polyester according to the invention has a higher degree of 1,4:3,6-dianhydro-L-iditol unit incorporation compared to other polyesters, such as poly(alkylene-co-dianhydrohexitol terephthalate), and in particular poly(alkylene-co-isosorbide terephthalate).

Indeed, the applicant has demonstrated that, under its synthesis conditions and at equal amount of 1,4:3,6-dianhydrohexitol unit, the thermoplastic polyester according to the invention has a degree of 1,4:3,6-dianhydro-L-iditol unit incorporation of at least 85%, or even of at least 90% according to certain concentrations, where, for example, poly(alkylene-co-isosorbide terephthalate) has a degree of 1,4:3,6-dianhydro-D-sorbitol unit incorporation of less than 85%.

Thus, the thermoplastic polyesters according to the invention are particularly advantageous in that, compared to poly(alkylene-co-isosorbide terephthalate)s, for similar amounts of 1,4:3,6-dianhydrohexitol units, they exhibit less loss during synthesis.

Likewise, it has been noted that the glass transition temperature is improved, as is the elongation at break, compared to poly(alkylene-co-isosorbide terephthalate).

For the purposes of the present invention, the degree of 1,4:3,6-dianhydro-L-iditol unit incorporation is described as high when the latter is at least 85% and in particular at least 90%. The polyesters thus obtained are described as polyesters having a high degree of 1,4:3,6-dianhydro-L-iditol unit incorporation.

The 1,4:3,6-dianhydro-L-iditol unit (A) is also called "isoiside". The latter can be obtained by dehydration of iditol. The thermoplastic polyester according to the invention is thus free of any other 1,4:3,6-dianhydrohexitol unit.

The molar amount of unit (A) is from 4 mol % to 90 mol % relative to the all the diol units present in the polyester. Preferably, the molar amount of 1,4:3,6-dianhydro-L-iditol unit (A) is from 4 mol % to 60 mol %, and most particularly from 4 mol % to 40 mol %. The amounts are expressed relative to the total amount of the diol units present in the polyester.

As mentioned previously, the thermoplastic polyester according to the invention has a particularly high degree of unit (A) incorporation. Indeed, the thermoplastic polyester according to the invention has a degree of 1,4:3,6-dianhydro-L-iditol unit incorporation of at least 85%, and most particularly a degree of 1,4:3,6-dianhydro-L-iditol unit incorporation of at least 90%. The expression "degree of incorporation" is intended to mean the ratio of the amount of 1,4:3,6-dianhydro-L-iditol units present in the final polyester as a function of the initial amount present in the reactor for the polymerization.

The thermoplastic polyester according to the invention is thus provided as a particularly advantageous alternative compared to the thermoplastic polyesters known from the prior art. Losses of 1,4:3,6-dianhydro-L-iditol units generated during the polycondensation are lower, but especially less considerable than those caused by the use of 1,4:3,6-dianhydro-D-sorbitol units. The thermoplastic polyester thus has a high degree of incorporation without the need to resort to a prepolymer synthesis step. Thus, the thermoplastic polyester according to the invention is also advantageous in terms of production cost.

The linear aliphatic diol unit (B) may be a linear or branched non-cyclic aliphatic diol. It may also be a saturated or unsaturated aliphatic non-cyclic diol. Aside from ethylene glycol, the saturated linear aliphatic non-cyclic diol may for example be 1,3-propanediol, 1,4-butanediol, 1,5-pentanediol, 1,6-hexanediol, 1,8-octanediol and/or 1,10-decanediol. As examples of saturated branched aliphatic non-cyclic diol, mention may be made of 2-methyl-1,3-propanediol, 2,2,4-trimethyl-1,3-pentanediol, 2-ethyl-2-butyl-1,3-propanediol, propylene glycol and/or neopentyl glycol. As an example of an unsaturated aliphatic diol, mention may be made, for example, of cis-2-butene-1,4-diol. Preferably, the linear aliphatic diol unit is ethylene glycol.

The molar amount of unit (B) is from 10 mol % to 96 mol % relative to the all the diol units present in the polyester. Preferably, the molar amount of linear aliphatic diol unit (B) is from 40 mol % to 96 mol %, and most particularly from 60 mol % to 96 mol %; the amounts being expressed relative to the total amount of the diol units present in the polyester.

The aromatic dicarboxylic acid unit (C) can be chosen from aromatic dicarboxylic acids known to those skilled in the art. The aromatic dicarboxylic acid can be a derivative of naphthalates, terephthalates or isophthalates or mixtures thereof. Advantageously, the aromatic dicarboxylic acid is a terephthalate derivative and, preferably, the aromatic dicarboxylic acid is terephthalic acid.

The reduced viscosity in solution of the thermoplastic polyester according to the invention may be greater than 25 ml/g, preferably greater than 45 ml/g, and even more preferably greater than 55 ml/g. The reduced viscosity in solution can be measured using an Ubbelohde capillary viscometer at 25° C. in an equi-mass mixture of phenol and ortho-dichlorobenzene after dissolving the polymer at 135° C. with stirring, the concentration of thermoplastic polymer introduced being 5 g/l.

This test for measuring reduced viscosity in solution is, due to the choice of solvents and the concentration of the polymers used, perfectly suited to determining the viscosity of the PAIIT of the present invention.

According to one particular embodiment, the thermoplastic polyester according to the invention is a poly(alkylene-co-isoidide terephthalate). The term "alkylene", alone or as part of another group, denotes a saturated hydrocarbon-based chain of formula $C_nH_{2n}$ wherein n is an integer greater than or equal to 1. Preferably, the poly(alkylene-co-isoidide terephthalate) is poly(ethylene-co-isoidide terephthalate).

The thermoplastic polyester of the invention may for example comprise:

a molar amount of 1,4:3,6-dianhydro-L-iditol units (A) ranging from 4 to 90 mol %, the amount being expressed relative to the total amount of diols, a molar amount of linear aliphatic diol units (B) ranging from 10 to 96 mol %, the amount being expressed relative to the total amount of diols, a molar amount of aromatic dicarboxylic acid units (C) ranging from 80 to 100 mol %, the amount being expressed relative to the total amount of diacids.

The amounts of different units in the thermoplastic polyester may be determined by $^1$H NMR or by chromatographic analysis of the mixture of monomers resulting from complete hydrolysis or methanolysis of the polyester. Preferably, the amounts of different units in the thermoplastic polyester are determined by $^1$H NMR.

Those skilled in the art can readily find the analysis conditions for determining the amounts of each of the units of the thermoplastic polyester. For example, from an NMR spectrum of a poly(ethylene-co-isoside terephthalate), the chemical shifts relating to the ethylene glycol are between 4.5 and 5.1 ppm, the chemical shifts relating to the terephthalate ring are between 7.8 and 8.4 ppm and the chemical shifts relating to the isoside are between 4.2 and 4.4 ppm, 4.85 and 5.0 ppm, and 5.2 and 5.8 ppm. The integration of each signal makes it possible to determine the amount of each unit of the polyester.

The thermoplastic polyester according to the invention may be semicrystalline or amorphous. The semicrystalline character of the polymer depends primarily on the amounts of each of the units in the polymer. Thus, when the polymer according to the invention comprises large amounts of 1,4:3,6-dianhydro-L-iditol units (A), the polymer is generally amorphous, whereas it is generally semicrystalline in the opposite case.

Preferably, when the polyester according to the invention is semicrystalline, it has a melting point ranging from 190 to 255° C., for example from 200 to 250° C.

Advantageously, when the thermoplastic polyester according to the invention is semicrystalline, it has a heat of fusion of greater than 20 J/g, preferably greater than 30 J/g, the measurement of this heat of fusion consisting in subjecting a sample of this polyester to a heat treatment at 170° C. for 10 hours, then in evaluating the heat of fusion by DSC by heating the sample at 10° C./min.

The thermoplastic polyester according to the invention in particular has a lightness L* greater than 40. Advantageously, the lightness L* is greater than 50, preferably greater than 60, most preferentially greater than 65, for example greater than 70. In addition, the thermoplastic polyester has an a* value of from −1.3 to 1.0, preferably from −1 to 0.5 and a b* value of from −2 to 3.0 and preferably from −1.6 to 2.0.

The coloration parameters L*, a* and b* may be determined using a spectrophotometer, via the CIE Lab model.

The thermoplastic polyester according to the invention has a high glass transition temperature. Advantageously, the PEIT has a glass transition temperature of 75° C. to 115° C., preferably from 80° C. to 105° C.

The glass transition temperatures and melting points are measured by conventional methods, especially using differential scanning calorimetry (DSC) using a heating rate of 10° C./min. The experimental protocol is described in detail in the examples section hereinafter.

Advantageously, the thermoplastic polyester according to the invention has improved mechanical properties. Indeed, the elongation at break and also the hardness are greater in the thermoplastic polyester according to the invention compared to other polyesters such as, for example, poly(alkylene-co-isosorbide terephthalate)s. Thus, the thermoplastic polyester according to the invention, when it is semicrystalline, can have an elongation at break of between 500% and 600%, such as for example approximately 550%.

Likewise, the thermoplastic polyester according to the invention has a longer half-crystallization time compared to a poly(alkylene-co-isosorbide terephthalate), thus resulting in better processability for the production of plastic articles, and an improvement in optical properties, in particular transparency properties.

Another subject of the invention is a process for producing the thermoplastic polyester according to the invention.

The production process according to the invention is particularly advantageous since it has an improved yield for the incorporation of the 1,4:3,6-dianhydro-L-iditol units within the thermoplastic polyester. Thus, the process for producing the thermoplastic polyester comprises:

a step of introducing, into a reactor, monomers comprising at least one 1,4:3,6-dianhydro-L-iditol (A), at least one linear aliphatic diol (B) and at least one aromatic dicarboxylic acid (C);

a step of introducing a catalytic system into the reactor;

a step of polymerizing said monomers so as to form the thermoplastic polyester, said step consisting of:

a first step of oligomerization, during which the reaction medium is stirred under an inert atmosphere at a temperature ranging from 230 to 280° C., advantageously from 240 to 270° C., for example 250° C.;

a second step of condensation of the oligomers, during which the oligomers formed are stirred under vacuum, at a temperature ranging from 250 to 300° C. so as to form the thermoplastic polyester, advantageously from 260 to 280° C., for example 265° C.;

a step of recovering the thermoplastic polyester.

If the polyester according to the invention is semicrystalline, this process may comprise a step of solid-state post-condensation under vacuum or while flushing with an inert gas, such as nitrogen ($N_2$) for example, and at a temperature lower by 5 to 30° C. than the melting point of the polyester.

The process comprises a first step of introducing, into a reactor, monomers comprising at least one 1,4:3,6-dianhydro-L-iditol (A), at least one linear aliphatic diol (B) and at least one aromatic dicarboxylic acid (C). The monomer (A) can be introduced in solution in water or also in solution in the linear aliphatic diol (B). In this case, it can be in the form of a powder, flakes or else a granule.

The process also comprises a step of introducing a catalytic system into the reactor. Catalytic system is intended to mean a catalyst or a mixture of catalysts, optionally dispersed or fixed on an inert support. The catalyst is used in amounts suitable for obtaining a thermoplastic polyester in accordance with the invention. The catalytic system is used in catalytic amounts customarily used for the production of aromatic polyesters. By way of example, the catalytic system can be used according to a mass amount of 10 to 500 ppm of metal relative to the final polyester.

The catalytic system is advantageously chosen from the group consisting of tin derivatives, preferentially derivatives of tin, titanium, zirconium, germanium, antimony, bismuth, hafnium, magnesium, cerium, zinc, cobalt, iron, manganese, calcium, strontium, sodium, potassium, aluminum or lithium, or of a mixture of two or more of these catalysts. Examples of such compounds may for example be those given in patent EP 1 882 712 B1 in paragraphs [0090] to [0094]. The catalyst is preferably a derivative of tin, titanium, germanium, aluminum or antimony, more preferentially a derivative of germanium, for example germanium oxide.

According to the process, an antioxidant is advantageously used during the step of polymerization of the monomers. These antioxidants make it possible to reduce the coloration of the PAIIT obtained. The antioxidants may be primary and/or secondary antioxidants. The primary antioxidant may be a sterically hindered phenol, such as the compounds Hostanox® O 3, Hostanox® O 10, Hostanox® O 16, Ultranox® 210, Ultranox® 276, Dovernox® 10, Dovernox® 76, Dovernox® 3114, Irganox® 1010, Irganox® 1076, Ethanox 330 or a phosphonate such as Irgamod® 195. The secondary antioxidant may be trivalent phosphorus compounds such as Ultranox® 626, Doverphos® S-9228, Hostanox® P-EPQ, ADK STAB PEP-8, ADK STAB 3010 or Irgafos 168.

It is also possible to introduce as polymerization additive into the reactor at least one compound that is capable of limiting unwanted etherification reactions, such as sodium acetate, tetramethylammonium hydroxide or tetraethylammonium hydroxide.

The process of the invention comprises a step of recovering the thermoplastic polyester resulting from the polymerization step. The thermoplastic polyester can be recovered by extracting it from the reactor in the form of a molten polymer rod. This rod can be converted into granules using conventional granulation techniques. The polyester thus recovered has a reduced viscosity in solution greater than 25 ml/g.

According to one variant of the process of the invention, the process for producing the thermoplastic polyester comprises a step of increasing the molar mass by post-polymerization of a polymer which comprises at least one 1,4:3, 6-dianhydro-L-iditol (A), at least one linear aliphatic diol unit (B) and at least one aromatic dicarboxylic acid unit (C). According to this second advantageous variant of the invention, it is possible to obtain a polyester having a particularly high reduced viscosity in solution, for example greater than 70 ml/g, preferably greater than 80 ml/g.

The post-polymerization step may consist of a step of solid-state polycondensation (SSP) of the polymer of lower reduced viscosity in solution or of a step of reactive extrusion of the polymer of lower reduced viscosity in solution in the presence of at least one chain extender. Preferably, the post-polymerization step is carried out by SSP.

SSP is generally carried out at a temperature between the glass transition temperature and the melting point of the polymer. Thus, in order to carry out the SSP, it is necessary for the polymer to be semicrystalline. Preferably, the latter has a heat of fusion of greater than 20 J/g, preferably greater than 30 J/g, the measurement of this heat of fusion consisting in subjecting a sample of this polymer of lower reduced viscosity in solution to a heat treatment at 170° C. for 10 hours, then in evaluating the heat of fusion by DSC by heating the sample at 10 K/min.

The invention also relates to a composition comprising the thermoplastic polyester described above, this composition possibly comprising at least one additive or at least one additional polymer or at least one mixture thereof.

The thermoplastic polyester composition according to the invention may comprise the polymerization additives optionally used during the process. It can also include other additives and/or additional polymers which are generally added during a subsequent thermomechanical mixing step or directly in one of the polymerization reactors.

By way of examples of additives, mention may be made of fillers or fibers of organic or mineral, nanometric or non-nanometric, functionalized or non-functionalized nature. They may be silicas, zeolites, glass beads or fibers, clays, mica, titanates, silicates, graphite, calcium carbonate, carbon nanotubes, wood fibers, carbon fibers, polymer fibers, proteins, cellulose-based fibers, lignocellulosic fibers and non-destructured granular starch. These fillers or fibers can make it possible to improve the hardness, the rigidity or the water- or gas-permeability. The composition may comprise from 0.1% to 75% by weight of fillers and/or fibers relative to the total weight of the composition, for example from 0.5% to 50%. The additive that is of use in the composition according to the invention may also comprise opacifiers, dyes and pigments. They may be chosen from cobalt acetate and the following compounds: HS-325 Sandoplast® Red BB (which is a compound bearing an azo function, also known under the name Solvent Red 195), HS-510 Sandoplast® Blue 2B which is an anthraquinone, Polysynthren® Blue R, and Clariant® RSB Violet.

The composition may also comprise, as additive, a processing aid, for reducing the pressure in the processing tool. A demolding agent which makes it possible to reduce adhesion to the materials for forming the polyester, such as the molds and the calendaring rolls, can also be used. These aids may be selected from fatty acid esters and fatty acid amides, metal salts, soaps, paraffins and hydrocarbon-based waxes. Particular examples of these aids are zinc stearate, calcium stearate, aluminum stearate, stearamides, erucamides, behenamides, beeswaxes or candelilla wax.

The composition according to the invention may also comprise other additives, such as stabilizers, for example light stabilizers, UV stabilizers and heat stabilizers, fluidizers, flame retardants and antistatic agents.

The composition may also comprise an additional polymer, different than the polyester according to the invention. This polymer may be chosen from polyamides, polyesters other than the polyester according to the invention, polystyrene, styrene copolymers, styrene-acrylonitrile copolymers, styrene-acrylonitrile-butadiene copolymers, poly(methyl methacrylate)s, acrylic copolymers, poly(ether-imide)s, poly(phenylene oxide)s, such as poly(2,6-dimethylphenylene oxide), poly(phenylene sulfate)s, poly(ester-carbonate)s, polycarbonates, polysulfones, polysulfone ethers, polyether ketones, and mixtures of these polymers.

The composition may also comprise, as additional polymer, a polymer for improving the impact properties of the polymer, in particular functional polyolefins such as functionalized ethylene or propylene polymers and copolymers, core-shell copolymers or block copolymers.

The composition according to the invention may also comprise polymers of natural origin, such as starch, cellulose, chitosans, alginates, proteins such as gluten, pea proteins, casein, collagen, gelatin or lignin, these polymers of natural origin possibly being physically or chemically modified. The starch can be used in destructured or plasticized form. In the latter case, the plasticizer may be water or a polyol, in particular glycerol, polyglycerol, isosidide, sorbitan, sorbitol, mannitol or else urea. The process described in document WO 2010/010 282 A1 may especially be used to prepare the composition.

The composition according to the invention may be produced by conventional thermoplastics mixing methods. These conventional methods comprise at least one step of mixing in the molten or softened state of the polymers and a step of recovering the composition. This process may be performed in paddle or rotor internal mixers, external mixers, or single-screw or twin-screw co-rotating or counter-rotating extruders. However, it is preferred to produce this mixture by extrusion, especially using a co-rotating extruder. The mixing of the constituents of the composition may also take place under an inert atmosphere.

The invention also relates to the use of the thermoplastic polyester according to the invention or of a composition comprising said polyester, for the production of finished or semi-finished plastic articles.

The plastic article may be of any type and may be obtained using conventional transformation techniques.

For films or sheets, in particular for use in the field of packaging, the latter can be produced by calendering, film cast extrusion, sheath blowing extrusion techniques, said techniques being optionally followed by monoaxial or polyaxial stretching or orientation techniques.

The plastic article according to the invention can also be a hollow article. It may be bottles, for example sparkling or still water bottles, juice bottles, carboys, soda bottles, alcoholic beverage bottles, small bottles/flasks, such as for example medicine bottles or cosmetic product bottles. The small bottles/flasks may be aerosols, dishes, for example for ready meals, microwave dishes, pots, for example yogurt pots, stewed fruit pots or cosmetic product pots, or also lids. These containers can be of any size and can be produced by extrusion blow molding, thermoforming or injection blow molding.

The plastic article according to the invention may also be an optical article, i.e. an article requiring good optical properties, such as lenses, disks, transparent or translucent panels, light-emitting diode (LED) components, optical fibers, films for LCD screens or else windows. By virtue of the high glass transition temperature of the polyester according to the invention, the optical articles have the advantage of being able to be placed close to sources of light and therefore of heat, while retaining excellent dimensional stability and good resistance to light.

The plastic articles may also be multilayer articles, at least one layer of which comprises the polymer or the composition according to the invention. These articles may be manufactured via a process comprising a coextrusion step in the case where the materials of the various layers are brought into contact in the molten state. By way of example, mention may be made of the techniques of tube coextrusion, profile coextrusion, coextrusion blow molding of a bottle, a small bottle or a tank, generally collated under the term "coextrusion blow molding of hollow bodies", coextrusion blow molding, also known as film blowing, and cast coextrusion. They may also be manufactured according to a process comprising a step of applying a layer of molten polyester onto a layer based on organic polymer, metal or adhesive composition in the solid state. This step may be performed by pressing, by overmolding, stratification or lamination, extrusion-lamination, coating, extrusion-coating or spreading.

The plastic article according to the invention may also be a fiber, a thread or a filament. The filaments may be obtained by various processes such as wet spinning, dry spinning, melt spinning, gel spinning (or dry-wet spinning), or else electrospinning. The filaments obtained by spinning may also be stretched or oriented.

The filaments, if desired, may be cut into short fibers; this makes it possible to mix these fibers with other fibers to create mixtures and obtain a thread.

The threads or filaments may also be woven, for the manufacture of fabrics for the clothing industry, carpets, curtains, wall hangings, household linens, wall coverings, boat sails, furniture fabrics or else safety belts or straps.

The threads, fibers or filaments may also be used in technical applications as reinforcers, such as in pipes, power belts, tires, or as a reinforcer in any other polymer matrix.

The threads, fibers or filaments may also be assembled in the form of nonwovens (e.g. felts), in the form of ropes, or else knitted in the form of nets.

The invention is also described in the examples below, which are intended to be purely illustrative and do not in any way limit the scope of the present invention.

EXAMPLES

The properties of the polymers were studied via the following techniques:

The reduced viscosity in solution is evaluated using an Ubbelohde capillary viscometer at 25° C. in an equi-mass mixture of phenol and ortho-dichlorobenzene after dissolving the polymer at 135° C. with magnetic stirring. For these measurements, the polymer concentration introduced is 5 g/l.

The color of the polymer was measured on the granules (25 grams of granules in the measuring cell) using a Konica Minolta CM-2300d spectrophotometer.

The mechanical properties of the polymers were evaluated according to the following standards:
Tensile test: ISO 527
DSC The thermal properties of the polyesters were measured by differential scanning calorimetry (DSC): the sample is first heated under a nitrogen atmosphere in an open crucible from 10 to 280° C. (10° C.·min$^{-1}$), cooled to 10° C. (10° C.·min$^{-1}$), then heated again to 320° C. under the same conditions as the first step. The glass transition temperatures were taken at the mid-point of the second heating. Any melting points are determined on the endothermic peak (peak onset) at the first heating. Similarly, the enthalpy of fusion (area under the curve) is determined at the first heating.

For the illustrative examples presented below, the following reagents were used:
Ethylene glycol (purity>99.8%) from Sigma-Aldrich
52.5% isoidide solution in water (purity>99.5%) prepared by Roquette
Terephthalic acid (purity 99+%) from Accros
Germanium dioxide (>99.99%) from Sigma Aldrich
Cobalt acetate tetrahydrate (99.999%) from Sigma Aldrich
Irganox 1010 from BASF SE: Antioxidant
Hostanox P-EPQ from Clariant: Antioxidant
Phosphoric acid (99.999+%) from Sigma Aldrich: Antioxidant
Tetraethylammonium hydroxide as a 40% solution in water, from Sigma Aldrich: polymerization additive limiting etherification reactions

EXAMPLES OF PREPARATION OF THERMOPLASTIC POLYESTERS ACCORDING TO THE INVENTION

Example 1

1079 g (17.40 mol) of ethylene glycol, 281 g of isoidide solution (1.01 mol), 2656 g (16.00 mol) of terephthalic acid, 0.5 g of tetraethylammonium hydroxide, 1.6 g of Irganox 1010, 0.29 g of cobalt acetate and 0.96 g of germanium dioxide are added to a 7.5 l reactor.

To extract the residual oxygen from the isosorbide crystals, four vacuum-nitrogen cycles are performed between 60 and 80° C. The reaction mixture is then heated to 260° C. (4° C./min) under 5.7 bar of pressure and with constant stirring (150 rpm). The degree of esterification is estimated from the amount of distillate collected.

The pressure is then reduced to 1.2 bar over the course of 20 minutes finally to evacuate the residual water. Once at atmospheric pressure, 1.6 g of Hostanox P-EPQ and 0.3 g of phosphoric acid are introduced into the reactor.

The pressure is then again reduced to 0.7 mbar over 90 minutes and the temperature is raised to 265° C. These vacuum and temperature conditions were maintained until an increase in torque of 15 Nm relative to the initial torque is obtained.

Finally, a polymer rod is cast via the bottom valve of the reactor, cooled in a heat-regulated water bath and chopped in the form of granules of about 15 mg.

The poly(ethylene-co-isoidide terephthalate) resin thus obtained has a reduced viscosity in solution of 66 ml/g, a glass transition temperature of 84° C., and a melting point at 241° C.

The polyester granules obtained have the following coloring characteristics: $L^*=51.5$, $a^*=0.1$ and $b^*=-1.1$. The level of isoidide incorporated into the chains is 5.2 mol % relative to the diols, that is to say a degree of incorporation of 94% relative to the amount introduced into the reactor.

Example 1A

The polyester of example 1 is used in a solid-state post-condensation step. First of all, the polymer is crystallized for 2 h 30 min under a nitrogen stream at 120° C. in a rotary evaporator with an oil bath equipped with a fluted round-bottom flask.

The crystallized polyester is then subjected to a temperature of 230° C. (temperature of the oil bath) and a nitrogen stream of 3.7 l/min.

After 21.5 hours of post-condensation, the polyester has a viscosity in solution of 98.3 ml/g. The level of isoidide incorporated into the chains is maintained at 5.2 mol % relative to the diols. The polyester granules obtained have the following coloring characteristics: $L^*=79.9$, $a^*=-0.9$ and $b^*=-1.5$.

The polyester was then injected and tensile tests were carried out. The polymer has a tensile modulus of 1090 MPa and an elongation at break of 560%±30%. The pencil hardness of the polymer is B.

Example 2

1004.4 g (16.2 mol) of ethylene glycol, 614.2 g of isoidide solution (corresponding to 2.2 mol % of isoidide), 2656.1 g (16.0 mol) of terephthalic acid, 0.5 g of tetraethylammonium hydroxide, 1.6 g of Irganox 1010, 0.34 g of cobalt acetate and 1.07 g of germanium dioxide are added to a 7.5 l reactor.

To extract the residual oxygen from the isosorbide crystals, four vacuum-nitrogen cycles are performed between 60 and 80° C. The reaction mixture is then heated to 250° C. (4° C./min) under 3 bar of pressure and with constant stirring (150 rpm). The degree of esterification is estimated from the amount of distillate collected.

The pressure is then reduced to 1.2 bar over the course of 20 minutes finally to evacuate the residual water. Once at atmospheric pressure, 1.6 g of Hostanox P-EPQ and 0.3 g of phosphoric acid are introduced into the reactor.

The pressure is then again reduced to 0.7 mbar over 90 minutes and the temperature is raised to 265° C. These vacuum and temperature conditions were maintained until an increase in torque of 15 Nm relative to the initial torque is obtained.

Finally, a polymer rod is cast via the bottom valve of the reactor, cooled in a heat-regulated water bath and chopped in the form of granules of about 15 mg.

The poly(ethylene-co-isoidide terephthalate) resin thus obtained has a reduced viscosity in solution of 66 ml/g and a glass transition of 93° C.

The polyester granules obtained have the following coloring characteristics: $L^*=51.4$, $a^*=-0.0$ and $b^*=1.0$. The level of isoidide incorporated into the chains is 11.0 mol % relative to the diols, that is to say a degree of incorporation of 91.7% relative to the amount introduced into the reactor.

Example 2A

The polyester of example 2 is used in a solid-state post-condensation step. First of all, the polymer is crystallized in a rotary evaporator with an oil bath equipped with a fluted round-bottom flask for 7 h under nitrogen stream and at a temperature gradually increased from 130 to 170° C. The crystallized polymer is then subjected to a temperature of 210° C. and a nitrogen stream of 2 l/min.

After 24 hours of post-condensation, the polyester has a viscosity in solution of 100.5 ml/g. The level of isoidide incorporated into the chains is maintained at 11.0 mol % relative to the diols. The polymer granules obtained have the following coloring characteristics: $L^*=79.2$, $a^*=-0.2$ and $b^*=1.8$.

Example 3

855.9 g (13.80 mol) of ethylene glycol, 1279.5 g of isoidide solution (4.6 mol), 2656.1 g (16.0 mol) of terephthalic acid, 0.5 g of tetraethylammonium hydroxide, 1.6 g of Irganox 1010, 0.49 g of cobalt acetate and 1.32 g of germanium dioxide are added to a 7.5 l reactor.

To extract the residual oxygen from the isosorbide crystals, four vacuum-nitrogen cycles are performed between 60 and 80° C. The reaction mixture is then heated to 250° C. (4° C./min) under 5.0 bar of pressure and with constant stirring (150 rpm). The degree of esterification is estimated from the amount of distillate collected.

The pressure is then reduced to 1.2 bar over the course of 20 minutes finally to evacuate the residual water. Once at atmospheric pressure, 1.6 g of Hostanox P-EPQ and 0.32 g of phosphoric acid are introduced into the reactor.

The pressure is then again reduced to 0.7 mbar over 90 minutes and the temperature is raised to 265° C. These vacuum and temperature conditions were maintained for 145 minutes until an increase in torque of 0.6 Nm relative to the initial torque is obtained.

Finally, a polyester rod is cast via the bottom valve of the reactor, cooled in a heat-regulated water bath and chopped in the form of granules of about 15 mg.

The poly(ethylene-co-isoidide terephthalate) resin thus obtained has a reduced viscosity in solution of 29 ml/g and a glass transition temperature of 105° C. The polyester granules. The level of isoidide incorporated into the chains is 24.4 mol % relative to the diols, that is to say a degree of incorporation of 98% relative to the ratio introduced into the reactor.

COMPARATIVE EXAMPLES: PREPARATION OF POLY(ETHYLENE-CO-ISOSORBIDE TEREPHTHALATE)

Counter-Example 1

1069.7 g (17.25 mol) of ethylene glycol, 169.7 g (1.16 mol) of isosorbide, 2656.1 g (16.00 mol) of terephthalic acid, 0.5 g of tetraethylammonium hydroxide, 1.6 g of Irganox 1010, 0.29 g of cobalt acetate and 0.96 g of germanium dioxide are added to a 7.5 l reactor.

To extract the residual oxygen from the isosorbide crystals, four vacuum-nitrogen cycles are performed between 60 and 80° C. The reaction mixture is then heated to 260° C. (4° C./min) under 5.7 bar of pressure and with constant stirring (150 rpm). The degree of esterification is estimated from the amount of distillate collected.

The pressure is then reduced to 1.2 bar over the course of 20 minutes finally to evacuate the residual water. Once at atmospheric pressure, 1.6 g of Hostanox P-EPQ and 0.3 g of phosphoric acid are introduced into the reactor.

The pressure is then again reduced to 0.7 mbar over 90 minutes and the temperature is raised to 265° C. These vacuum and temperature conditions were maintained until an increase in torque of 15 Nm relative to the initial torque is obtained.

Finally, a polymer rod is cast via the bottom valve of the reactor, cooled in a heat-regulated water bath and chopped in the form of granules of about 15 mg.

The poly(ethylene-co-isosorbide terephthalate) resin thus obtained has a reduced viscosity in solution of 68 ml/g, a glass transition temperature of 82° C., and a melting point at 243° C.

The polymer granules obtained have the following coloring characteristics: $L^*=51.8$, $a^*=0.2$ and $b^*=-1.9$. The level of isosorbide incorporated into the chains is 5.0 mol % relative to the diols, that is to say a degree of incorporation of 79% relative to the ratio introduced into the reactor.

Counter-Example 1A

The polyester of counter-example 1 is used in a solid-state post-condensation step. First of all, the polymer is crystallized for 2 h 30 min under a nitrogen stream at 120° C. in a rotary evaporator with an oil bath equipped with a fluted round-bottom flask. The crystallized polymer is then subjected to a temperature of 230° C. (temperature of the oil bath) and a nitrogen stream of 3.7 l/min.

After 24 hours of post-condensation, the polymer will have a viscosity in solution of 101 ml/g. The polymer granules obtained have the following coloring characteristics: $L^*=80.6$, $a^*=-1.1$ and $b^*=-2.8$. The level of isosorbide incorporated into the chains is at 4.9 mol % relative to the diols.

The polymer was then injected and tensile tests were carried out. The polymer has a tensile modulus of 1090 MPa and an elongation at break of 480%±30%. The pencil hardness of the polymer is 2B.

Counter-Example 2

1004.4 g (16.2 mol) of ethylene glycol, 322.4 g (2.2 mol) of isosorbide, 2656.1 g (16.0 mol) of terephthalic acid, 0.5 g of tetraethylammonium hydroxide, 1.6 g of Irganox 1010, 0.34 g of cobalt acetate and 1.07 g of germanium dioxide are added to a 7.5 l reactor.

To extract the residual oxygen from the isosorbide crystals, four vacuum-nitrogen cycles are performed between 60 and 80° C. The reaction mixture is then heated to 250° C. (4° C./min) under 3 bar of pressure and with constant stirring (150 rpm). The degree of esterification is estimated from the amount of distillate collected. The pressure is then reduced to 1.2 bar over the course of 20 minutes finally to evacuate the residual water. Once at atmospheric pressure, 1.6 g of Hostanox P-EPQ and 0.3 g of phosphoric acid are introduced into the reactor. The pressure is then again reduced to 0.7 mbar over 90 minutes and the temperature is raised to 265° C. These vacuum and temperature conditions were maintained until an increase in torque of 15 Nm relative to the initial torque is obtained. Finally, a polymer rod is cast via the bottom valve of the reactor, cooled in a heat-regulated water bath and chopped in the form of granules of about 15 mg.

The poly(ethylene-co-isosorbide terephthalate) resin thus obtained has a reduced viscosity in solution of 66 ml/g and a glass transition temperature of 89° C. The polymer granules obtained have the following coloring characteristics: $L^*=52.1$, $a^*=-0.1$ and $b^*=1.4$. The level of isosorbide incorporated into the chains is 9.4 mol % relative to the diols, that is to say a degree of incorporation of 78.3% relative to the ratio introduced into the reactor.

Counter-Example 2A

The polyester of counter-example 2 is used in a solid-state post-condensation step. First of all, the polymer is crystallized in a rotary evaporator with an oil bath equipped with a fluted round-bottom flask for 3 h 15 under a nitrogen stream and at a temperature of 130. The crystallized polymer is then subjected to a temperature of 210° C. and a nitrogen stream of 2 l/min.

After 27 h of post-condensation, the polymer will have a viscosity in solution of 99.5 ml/g. The level of isosorbide incorporated into the chains is maintain at 9.4 mol % relative to the diols. The polymer granules obtained have the following coloring characteristics: $L^*=78.8$, $a^*=-0.4$ and $b^*=1.7$.

Counter-Example 3

856.1 g (13.8 mol) of ethylene glycol, 672.0 g (4.6 mol) of isosorbide, 2656.1 g (16.0 mol) of terephthalic acid, 0.5 g of tetraethylammonium hydroxide, 1.6 g of Irganox 1010, 0.49 g of cobalt acetate and 1.32 g of germanium dioxide are added to a 7.5 l reactor.

To extract the residual oxygen from the isosorbide crystals, four vacuum-nitrogen cycles are performed between 60 and 80° C. The reaction mixture is then heated to 250° C. (4° C./min) under 5.0 bar of pressure and with constant stirring (150 rpm). The degree of esterification is estimated from the amount of distillate collected.

The pressure is then reduced to 1.2 bar over the course of 20 minutes finally to evacuate the residual water. Once at atmospheric pressure, 1.6 g of Hostanox P-EPQ and 0.3 g of phosphoric acid are introduced into the reactor.

The pressure is then again reduced to 0.7 mbar over 90 minutes and the temperature is raised to 265° C. These vacuum and temperature conditions were maintained until an increase in torque of 15 Nm relative to the initial torque is obtained.

Finally, a polymer rod is cast via the bottom valve of the reactor, cooled in a heat-regulated water bath and chopped in the form of granules of about 15 mg.

The poly(ethylene-co-isosorbide terephthalate) resin thus obtained has a reduced viscosity in solution of 56 ml/g and a glass transition temperature of 96° C.

The polymer granules obtained have the following coloring characteristics: L*=50.0, a*=−0.6 and b*=1.4. The level of isosorbide incorporated into the chains is 20.8 mol % relative to the diols, that is to say a degree of incorporation of 83% relative to the ratio introduced into the reactor.

CONCLUSION OF THE TESTS

In the equivalent preparation conditions, the thermoplastic polymers of onto the invention exhibit improvement in hardness and elongation at break, but also much higher degrees incorporation than the isosorbide-based polyesters.

The invention claimed is:

1. A thermoplastic polyester comprising:
   at least one 1,4:3,6-dianhydro-L-iditol unit (A), in a molar amount ranging from 4 to 90 mol %, the molar amount being expressed relative to the total amount of diols in the thermoplastic polyester,
   at least one linear aliphatic diol unit (B),
   at least one aromatic dicarboxylic acid unit (C),
   the thermoplastic polyester having a reduced viscosity in solution (25° C.; phenol (50 wt. %):ortho-dichlorobenzene (50 wt. %); 5 g of polyester/l) greater than 25 ml/g,
   the thermoplastic polyester being free of any 1,4:3,6-dianhydrohexitol unit other than the 1,4:3,6-dianhydro-L-iditol unit (A), and
   the thermoplastic polyester having an elongation at break of from 550% to 600%.

2. The thermoplastic polyester as claimed in claim 1, wherein the linear aliphatic diol unit (B) is a saturated non-cyclic linear aliphatic diol chosen from ethylene glycol, 1,3-propanediol, 1,4-butanediol, 1,5-pentanediol, 1,6-hexanediol, 1,8-octanediol and 1,10-decanediol.

3. The thermoplastic polyester as claimed in claim 2, wherein the saturated linear non-cyclic aliphatic diol is ethylene glycol.

4. The thermoplastic polyester as claimed in claim 1, wherein the aromatic dicarboxylic acid unit (C) is terephthalic acid.

5. The thermoplastic polyester as claimed in claim 1, wherein the glass transition temperature is from 75° C. to 115° C.

6. The thermoplastic polyester as claimed in claim 1, wherein the thermoplastic polyester comprises:
   a molar amount of linear aliphatic diol units (B) ranging from 10 to 96 mol %, the amount being expressed relative to the total amount of diols in the thermoplastic polyester,
   a molar amount of aromatic dicarboxylic acid units (C) ranging from 80 to 100 mol %, the amount being expressed relative to the total amount of diacids in the thermoplastic polyester.

7. A process for preparing a thermoplastic polyester as claimed in claim 1, comprising:
   a step of introducing, into a reactor, monomers comprising the at least one 1,4:3,6-dianhydro-L-iditol (A), the at least one linear aliphatic diol (B) and the at least one aromatic dicarboxylic acid (C);
   a step of introducing a catalytic system into the reactor;
   a step of polymerizing the monomers so as to form the thermoplastic polyester, the polymerizing step consisting of:
      a first step of oligomerization, during which the reaction medium is stirred under an inert atmosphere at a temperature ranging from 230 to 280° C.;
      a second step of condensation of the oligomers, during which the oligomers formed are stirred under vacuum, at a temperature ranging from 250 to 300° C. so as to form the thermoplastic polyester; and
   a step of recovering the thermoplastic polyester.

8. A composition comprising the thermoplastic polymer as claimed in claim 1.

9. The composition as claimed in claim 8, wherein the composition further comprises an additional polymer making it possible to improve impact properties of the polymer, the polymer is a functional polyolefin.

10. A method comprising forming finished or semi-finished plastic articles from the thermoplastic polyester as claimed in claim 1.

11. The process according to claim 7, wherein
   in the first step of oligomerization, the reaction medium is stirred under an inert atmosphere at a temperature ranging from 240 to 270° C., and
   in the second step of condensation of the oligomers, the oligomers formed are stirred under vacuum at a temperature ranging from 260 to 280° C.

12. The process according to claim 7, wherein
   in the first step of oligomerization, the reaction medium is stirred under an inert atmosphere at a temperature ranging of 250° C., and
   in the second step of condensation of the oligomers, the oligomers formed are stirred under vacuum at a temperature of 265° C.

13. The composition as claimed in claim 9, wherein the functional polyolefin is selected from the group consisting of functionalized ethylene or propylene polymers and copolymers, core-shell copolymers and block copolymers.

* * * * *